US006441060B1

(12) United States Patent
Hendershot et al.

(10) Patent No.: US 6,441,060 B1
(45) Date of Patent: Aug. 27, 2002

(54) FOUNDRY BINDER OF EPOXY RESIN, ACRYLATED POLYISOCYANATE AND ACRYLIC

(75) Inventors: Don Greg Hendershot, Columbus; Edward Gerard Toplikar, Hilliard; Laurence G. Dammann, Powell; Vincent J. Pascarella, Perrysville, all of OH (US)

(73) Assignee: Ashland Inc., Dublin, OH (US)

( * ) Notice: Subject to any disclaimer, the term of this patent is extended or adjusted under 35 U.S.C. 154(b) by 0 days.

(21) Appl. No.: 09/661,047

(22) Filed: Sep. 14, 2000

Related U.S. Application Data

(63) Continuation of application No. 09/145,701, filed on Sep. 2, 1998, now abandoned.

(51) Int. Cl.[7] .............................. B22C 1/22; C08K 3/34; C08K 3/36
(52) U.S. Cl. ......................... 523/142; 523/466; 523/428
(58) Field of Search ................................ 523/139, 142, 523/466, 428

(56) References Cited

U.S. PATENT DOCUMENTS

| 3,676,392 A | 7/1972 | Robins |
| 4,051,092 A | 9/1977 | Holik et al. |
| 4,518,723 A | 5/1985 | Woodson |
| 4,526,219 A | 7/1985 | Dunnavant et al. |
| 4,585,809 A | 4/1986 | Auer et al. .................. 523/139 |
| 5,468,832 A | 11/1995 | Schrader et al. ............... 528/53 |
| 5,554,692 A | 9/1996 | Ross ........................... 525/124 |
| 5,596,021 A | 1/1997 | Adembri et al. ............ 525/528 |

FOREIGN PATENT DOCUMENTS

| EP | 0769338 A1 | 4/1997 |
| GB | 2011432 | 7/1979 |

*Primary Examiner*—Robert E. L. Sellers
(74) *Attorney, Agent, or Firm*—David L. Hedden

(57) ABSTRACT

The subject invention relates to a foundry binder system which cures in the presence of a volatile amine curing catalyst comprising (a) an epoxy resin, (b) an acrylated organic polyisocyanate, (c) a reactive unsaturated acrylic monomer, acrylic polymer, or mixtures thereof, and (d) an oxidizing agent comprising a hydroperoxide. The foundry binders are used for making foundry mixes. The foundry mixes are used to make foundry shapes which are used to make metal castings.

8 Claims, No Drawings

US 6,441,060 B1

FOUNDRY BINDER OF EPOXY RESIN, ACRYLATED POLYISOCYANATE AND ACRYLIC

This application is a continuation, of application Ser. No. 09/145,701 as filed on Sep. 2, 1998, now abandoned.

FIELD OF THE INVENTION

The subject invention relates to a foundry binder system which cures in the presence of a volatile amine curing catalyst comprising (a) an epoxy resin, (b) an acrylated organic polyisocyanate, (c) a reactive unsaturated acrylic monomer, acrylic polymer, or mixtures thereof, and (d) an oxidizing agent comprising a hydroperoxide. The foundry binders are used for making foundry mixes. The foundry mixes are used to make foundry shapes which are used to make metal castings.

BACKGROUND OF THE INVENTION

One of the major processes used in the foundry industry for making metal parts is sand casting. In sand casting, disposable foundry shapes (usually characterized as molds and cores) are made by shaping and curing a foundry mix which is a mixture of sand and an organic or inorganic binder. The binder is used to strengthen the molds and cores.

The two major processes used in sand casting for making molds and cores are the (a) cold-box process and the (b) no-bake process. In the cold-box process, a gaseous curing agent is passed through a compacted shaped mix to produce a cured mold and/or core. In the no-bake process, a liquid curing catalyst is mixed with the sand and shaped into a core or and/or mold.

The major cold-box process is based upon polyurethane-forming binders. See for example U.S. Pat. Nos. 3,409,579 and 3,676,392. These systems are cured with a gaseous tertiary amine catalyst. The polyurethane-forming binder system usually consists of a phenolic resin component and polyisocyanate component which are mixed with sand prior to compacting and curing to form a foundry mix.

When the two components of the polyurethane-forming binder system are mixed with the sand to form a foundry mix, they may prematurely react prior to curing with the gaseous catalyst. If this reaction occurs, it will reduce the flowability of the foundry mix when it is used for making molds and cores, and the resulting molds and cores will have reduced strengths. This reduced flowability and decrease in strength with time is related to the benchlife of the foundry mix.

Sufficient benchlife of the foundry mix is important to the commercial success of these binders. Benchlife is the time interval between forming the foundry mix and the time when the foundry mix is no longer useful for making acceptable molds and cores. A measure of the usefulness of the foundry mix and the acceptability of the molds and cores prepared with the foundry mix is the tensile strength of the molds and cores. If a foundry mix is used after the benchlife has expired, the resulting molds and cores will have unacceptable tensile strengths.

Because it is not always possible to use the foundry mix immediately after mixing, it is desirable to prepare foundry mixes with an extended benchlife. When polyurethane-forming cold-box binders are used, generally a compound which improves the benchlife of the foundry mix must be added to the binder, usually to the polyisocyanate component of the binder.

Among the compounds useful for extending the benchlife of the foundry mix are organic and/or inorganic phosphorus containing compounds. Examples of organic phosphorus-containing compounds used as benchlife extenders with polyurethane-forming binder systems are disclosed in U.S. Pat. No. 4,436,881 which discloses certain organic phosphorus containing compounds such as dichloroarylphosphine, chlorodiarylphosphine, arylphosphinic dichloride, or diarylphosphinyl chloride, and U.S. Pat. No. 4,683,252 which discloses organohalophosphates such as mono-phenyldichlorophosphate.

Examples of inorganic phosphorus-containing compounds which extend the benchlife of polyurethane-forming binder systems are disclosed in U.S. Pat. No. 4,540,724 which discloses inorganic phosphorus halides such as phosphorus oxychloride, phosphorus trichloride, and phosphorus pentachloride, and U.S. Pat. No. 4,602,069 which discloses inorganic phosphorus acids such as orthophosphoric acid, phosphoric acid, hypophosphoric acid, metaphosphoric acid, pyrophosphoric acid, and poly-phosphoric acid.

As can be seen, there are numerous benchlife extenders for polyurethane-forming cold-box binders which reflects the interest in extending the benchlife of the foundry mix.

Despite the cited work, there is still a need for amine-cured binder systems with longer benchlife, particularly those which do not require expensive additives.

SUMMARY OF THE INVENTION

The invention relates to a foundry binder system which will cure in the presence of a volatile amine curing catalyst comprising:
  (a) from 5 to 80 weight percent of an epoxy resin;
  (b) from 10 to 80 weight percent of an acrylated organic polyisocyanate;
  (c) from 5 to 75 weight percent of a reactive unsaturated acrylic monomer, acrylic polymer, and mixtures thereof; and
  (d) an effective oxidizing amount of an oxidizing agent comprising a hydroperoxide, where (a), (b), (c), and (d) are separate components or can be mixed with another component, provided (b) or (c) is not mixed with (d), and where said weight percents are based upon the total weight of (a), (b), (c), and (d). Generally, the weight percent of (a) is 5 to 50, the weight percent of (b) is 10 to 40, the weight percent of (c) is 20 to 60 and the weight percent of (d) is 1 to 30. Preferably, the weight percent of (a) is 5 to 20, the weight percent of (b) is 15 to 40, the weight percent of (c) is 20 to 55, and the weight percent of (d) is 1 to 20. More preferably, the weight percent of (a) is 5 to 25, the weight percent of (b) is 20 to 40, the weight percent of (c) is 30 to 55, and the weight percent of (d) is 5 to 15.

The foundry binders are used for making foundry mixes. The foundry mixes are used to make foundry shapes which are used to make metal castings. The use of an acrylated organic polyisocyanate in the foundry binder instead of an organic polyisocyanate which is not acrylated, improves the benchlife of foundry mixes made with the foundry binder. The foundry mixes produce cores and molds with adequate tensile strengths for commercial use. Castings, made with an assembly of cores and/or molds made with the binders, are acceptable for commercial use. Additionally, the binder does not contain any free phenol or free formaldehyde, and has zero or low volatile organic compounds (VOC).

BEST MODE AND OTHER MODES OF PRACTICING THE INVENTION

It is preferred to package and use the binders system as a two part system. Part I (epoxy component) comprises the epoxy resin, oxidizing agent, solvents, and other optional components. Part II (polyisocyanate component) comprises the (1) acrylated organic polyisocyanate, (2) a reactive unsaturated acrylic monomer, polymer, or mixtures thereof, (3) solvents, and (4) other optional components. Usually, the Part I is first mixed with sand and then the Part II is added to make a foundry mix which is shaped and cured. The weight ratio of epoxy resin to acrylated organic polyisocyanate generally is from 1:10 to 10:1, preferably from 1:5 to 5:1, most preferably from 1:3 to 3:1. The weight ratio of acrylated polyisocyanate to reactive unsaturated acrylate is generally from 1:10 to 5:1, preferably from 1:5 to 2:1.

For purposes of this disclosure, "epoxy resin" is defined as a thermosetting resin which contains one or more reactive epoxide group per molecule. Such resins have either a mixed aliphatic-aromatic or exclusively non-aromatic (i.e., aliphatic or cycloaliphatic) molecular structure. The mixed aliphatic-aromatic epoxy resins generally are prepared by the well-known reaction of a bis-(hydroxy-aromatic)alkane or a tetrakis-(hydroxy-aromatic) alkane with a halogen-substituted aliphatic epoxide in the presence of a base such as sodium hydroxide or potassium hydroxide. Examples of the halogen-substituted aliphatic epoxides include epichlorohydrin, 4-chloro-1,2-epoxybutane, 5-bromo-1,2-epoxypentane, 6-chloro-1,3-epoxyhexane and the like. In general, it is preferred to use a chloride substitute terminal denoting that the epoxide group is on the end of the alkyl chain.

The most widely used epoxy resins are diglycidyl ethers of bisphenol A. These are made by reaction of epichlorohydrin with bisphenol A in the presence of an alkaline catalyst. By controlling the operating conditions and varying the ratio epichlorohydrin to bisphenol A, products of different molecular weight can be made. Other epoxy resins include (a) the diglycidyl ethers of other bisphenol compounds such as bisphenol B, F, G, and H, (b) epoxy resins produced by reacting a novolac resin with a halogen-substituted aliphatic epoxide such as epichlorohydrin, 4-chloro- 1,2-epoxybutane, 5-bromo- 1,2-epoxypentane, 6-chloro-1,3-epoxyhexane and the like, (c) epoxidized polybutadiene resins, and (d) epoxidized drying oils.

Particularly preferred are epoxy resins with a weight per epoxy group of 175 to 200. Although the viscosities of the epoxy resins are high, usually greater than 5,000 cps at 25° C., the epoxy component viscosity is reduced to a workable level when the epoxy resin is mixed with the oxidizing agent. Useful epoxy resins are disclosed in U.S. Pat. No. 4,518,723 which is hereby incorporated by reference into this disclosure.

The oxidizing agent used in the Part I includes at least one hydroperoxide, and may also include ketone peroxides, peroxy ester oxidizing agents, alkyl oxides, chlorates, perchlorates, and perbenzoates. Preferably, however, the oxidizing agent is a hydroperoxides or a mixture of peroxide and hydroperoxide. Hydroperoxides particularly preferred in the invention include t-butyl hydroperoxide, cumene hydroperoxide, paramenthane hydroperoxide, etc. The organic peroxides may be aromatic or alkyl peroxides. Examples of useful diacyl peroxides include benzoyl peroxide, lauroyl peroxide and decanoyl peroxide. Examples of alkyl peroxides include dicumyl peroxide and di-t-butyl peroxide. Mixtures of one or more of the above organic peroxides or hydroperoxides can be utilized.

Although not necessarily preferred, the epoxy component, may contain a solvent, such as an aromatic hydrocarbon solvent such as benzene, toluene, xylene, ethylbenzene, naphthalenes, or an ester solvent, such as rapeseed methyl ester, or mixtures thereof, and the like. If a solvent is used, sufficient solvent should be used so that the resulting viscosity of the Part I is less than 1,000 centipoise, preferably less than 400 centipoise. Generally, however, the total amount of solvent is used in an amount of 0 to 25 weight percent based upon the total weight of the epoxy resin.

For the purpose of defining this invention, "an acrylated organic polyisocyanate" is an organic polyisocyanate which is reacted with a hydroxyl or carboxylic acid containing unsaturated acrylic monomer, acrylic polymer, or mixtures thereof. The term "acrylated organic polyisocyanate" includes mixtures of acrylated organic polyisocyanates and organic polyisocyanates which are not acrylated and have free isocyanato groups (NCO groups). The acrylated organic polyisocyanate may be a totally acrylated organic polyisocyanate, where all of the NCO groups of the organic polyisocyanate are reacted with the hydroxyl or carboxylic acid group of the unsaturated acrylic monomer or polymer; or preferably a partially acrylated organic polyisocyanate which contains free NCO groups after the reaction.

The acrylated organic polyisocyanate must contain some free NCO, which is either found in the molecules of the partially acrylated organic polyisocyanate and/or in organic polyisocyanates having free NCO which are mixed with the acrylated organic polyisocyanate. Although any acrylated organic polyisocyanate can be blended with an organic polyisocyanate, it is necessary to blend totally acrylated organic polyisocyanates with an organic polyisocyanate having free NCO, since the totally acrylated organic polyisocyanates do not have free NCO groups. Typically the amount of organic polyisocyanate blended with the acrylated organic polyisocyanate is from 0 to about 98 weight, based upon the combined weight of the acrylated organic polyisocyanate and the organic polyisocyanate blended with it, preferably from 2 to 98 weight percent. The acrylated polyisocyanate (which includes blends of acrylated organic polyisocyanates, whether they be totally or partially acrylated, and organic polyisocyanates which are not acrylated), typically contains at least 5 weight percent free NCO and typically no more than 20 weight percent free NCO, where the weight percent is based upon the weight of the binder system, preferably from 7 weight percent to 11 weight percent free NCO.

The acrylated organic polyisocyanate is prepared by reacting the organic polyisocyanate with typically from 2 to 49 weight percent, preferably from 2 to 30 weight percent, of a reactive unsaturated acrylic monomer or polymer having a free hydroxyl or free carboxylic acid functional group. Typical acrylic monomers, which can be used as the reactive unsaturated acrylic monomer in preparing the acrylated organic polyisocyanates, include hydroxyalkyl acrylates, carboxylic acid containing acrylates, alkoxyalkyl acrylates, hydroxyalkyl methacrylates, alkoxyalkyl methacrylates, N-alkoxymethylacrylamides, N-alkoxymethylmethacrylamides, and mixtures thereof. Preferably used as the monomers to modify the organic polyisocyanate are acrylic monomers selected from the group consisting of acrylic acid, methacrylic acid, substituted variations of acrylic acid or methacrylic acid, hydroxy ethyl acrylate, and hydroxy propyl acrylate.

Typical acrylic polymers, which can be used as the reactive unsaturated polymer to prepare the acrylated organic polyisocyanates, include epoxy acrylate reaction products, polyester/urethane/acrylate reaction products, acrylated urethane oligomers, polyether acrylates, polyester acrylates, acrylated epoxy resins, vinyl polyesters, vinyl esters, and dicylopentadiene resins.

The general procedure for preparing the acrylated organic polyisocyanate involves heating the acrylic monomer or polymer in the presence of the organic polyisocyanate until all of the hydroxy or carboxylic acid component has reacted.

The organic polyisocyanate used to prepare the partially acrylated organic polyisocyanate is an organic polyisocyanate having a functionality of two or more, preferably 2 to 5. It may be aliphatic, cycloaliphatic, aromatic, or a hybrid polyisocyanate. Mixtures of such polyisocyanates may be used. Representative examples of organic polyisocyanates are aliphatic polyisocyanates such as hexamethylene diisocyanate, alicyclic polyisocyanates such as 4,4'-dicyclohexylmethane diisocyanate, and aromatic polyisocyanates such as 2,4-diphenylmethane diisocyanate and 2,6-toluene diisocyanate, and dimethyl derivatives thereof. Other examples of suitable organic polyisocyanates are 1,5-naphthalene diisocyanate, triphenylmethane triisocyanate, xylylene diisocyanate, and the methyl derivatives thereof, polymethylenepolyphenyl isocyanates, chlorophenylene-2,4-diisocyanate, and the like. The organic polyisocyanate is used in a liquid form. Solid or viscous polyisocyanates must be used in the form of organic solvent solutions, the solvent generally being present in a range of up to 80 percent by weight of the solution.

The reactive unsaturated acrylic monomer, polymer, or mixture thereof, preferably as part of the Part II, contains ethylenically unsaturated bonds, but does not contain any free hydroxyl or carboxylic acid functional groups. Examples of such materials include a wide variety of monofunctional, difunctional, trifunctional, tetrafunctional and pentafunctional monomeric acrylates. A representative listing of these monomers includes alkyl acrylates, acrylated epoxy resins, cyanoalkyl acrylates, alkyl methacrylates, cyanoalkyl methacrylates, and difunctional monomeric acrylates. Other acrylates which can be used include trimethylolpropane triacrylate, methacrylic acid and 2-ethylhexyl methacrylate.

Typical reactive unsaturated acrylic polymers, which may also be used include epoxy acrylate reaction products, polyester/urethane/acrylate reaction products, acrylated urethane oligomers, polyether acrylates, polyester acrylates, and acrylated epoxy resins.

Although solvents are not required for the organic polyisocyanate component, typical solvents which can be used are generally polar solvents include liquid dialkyl esters such as dialkyl phthalate of the type disclosed in U.S. Patent 3,905,934 and other dialkyl esters such as dimethyl glutarate. Methyl esters of fatty acids, particularly rapeseed methyl ester, are also useful solvents. Suitable aromatic solvents are benzene, toluene, xylene, ethylbenzene, and mixtures thereof. Preferred aromatic solvents are mixed solvents that have an aromatic content of at least 90% and a boiling point range of 138° C. to 232° C. Suitable aliphatic solvents include kerosene.

Free radical scavengers or inhibitors. such as benzoquinone can be added to the binder. Benzoquinone acts as a free radical inhibitor/scavenger to inhibit the free radical reactions that cause instability in the binder. The amount of benzoquinone used is generally from 0 to 3 weight percent, preferably 0 to 1 weight percent based upon the total weight of the binder. The benzoquinone may be incorporated into a solvent which may be used in either the epoxy component (Part I) or the polyisocyanate component (Part I), or both. It is especially beneficial when used in the part containing the reactive unsaturated acrylic monomer or polymer.

Various types of aggregate and amounts of binder are used to prepare foundry mixes by methods well known in the art. Ordinary shapes, shapes for precision casting, and refractory shapes can be prepared by using the binder systems and proper aggregate. The amount of binder and the type of aggregate used is known to those skilled in the art. The preferred aggregate employed for preparing foundry mixes is sand wherein at least about 70 weight percent, and preferably at least about 85 weight percent, of the sand is silica. Other suitable aggregate materials for ordinary foundry shapes include zircon, olivine, aluminosilicate, chromite sands, and the like.

In ordinary sand type foundry applications, the amount of binder is generally no greater than about 10% by weight and frequently within the range of about 0.5% to about 7% by weight based upon the weight of the aggregate. Most often, the binder content for ordinary sand foundry shapes ranges from about 0.6% to about 5% by weight based upon the weight of the aggregate in ordinary sand-type foundry shapes.

It will be apparent to those skilled in the art that other additives such as silanes, silicones, benchlife extenders, release agents, defoamers, wetting agents, etc. can be added to the aggregate, or foundry mix. The particular additives chosen will depend upon the specific purposes of the formulator.

The foundry mix is molded into the desired shape and whereupon it is cured by the cold-box process. Curing by the cold-box process is carried out by contacting the foundry shape with a gaseous tertiary amine as described in U.S. Pat. No. 3,409,579 which is hereby incorporated into this disclosure by reference. Examples of volatile tertiary amines which can be used include trimethylamine, dimethylethylamine, methyldiethylamine, triethylamine, dimethylethanolamine, and the like.

EXAMPLES

The examples will illustrate specific embodiments of the invention. These examples along with the written description will enable one skilled in the art to practice the invention. It is contemplated that many other embodiments of the invention will be operable besides these specifically disclosed. All parts are by weight and all temperatures are in ° C. unless otherwise specified. The examples set forth describe various embodiments of the invention, but they are not intended to imply that other embodiments will not work effectively. The following abbreviations are used in the Examples:

| ABBREVIATIONS AND DEFINITIONS | |
| --- | --- |
| DER | epoxy resin DER 331, the epoxy resin used in the examples which is prepared by and sold commercially by Dow Chemical. |
| CHP | cumene hydroperoxide. |
| DICUP | dicumyl peroxide. |
| DMEA | N,N-dimethylethylamine gas as catalyst. |
| HPA | hydroxy propyl acrylate. |
| LB | low odor base solvent. |
| OPI | a polyphenylene polymethylene organic polyisocyanate having a functionality of about 2 to 3. |
| OS | rapeseed methyl ester solvent. |
| PAOPI | a partially acrylated organic polyisocyanate prepared by reacting OPI with HPA at a temperature of 60° for about 75 minutes. |
| PAOPI (5) | a partially acrylated organic polyisocyanate prepared with 5 weight percent HPA. |

-continued

ABBREVIATIONS AND DEFINITIONS

| | |
|---|---|
| PAOPI (10) | a partially acrylated organic polyisocyanate prepared with 10 weight percent HPA. |
| TMPTA | trimethylolpropane triacrylate. |

In order to carry out the examples, the Part I was first mixed with sand then the Part II was added and the sand was remixed (see Table II for a description of Part I and Part II).

The resulting foundry mixes were compacted into a dogbone shaped core box by blowing and were cured using the cold-box process as described in U.S. Pat. No. 3,409,579. In this instance, the compacted mixes were then contacted with a mixture of N,N-dimethylethylamine (DMEA) gas in nitrogen at 20 psi for 2.0 seconds, followed by purging with nitrogen at about 18 psi for about 4.0 seconds, thereby forming AFS tensile test specimens (dog bones) using the standard AFS procedure.

Measuring the tensile strength of the dog bone shapes enables one to predict how the mixture of sand and binder will work in actual foundry operations. As a foundry mix ages, lower tensile strengths for the shapes indicate that the binder components have reacted more extensively after mixing with the sand and prior to curing with amine gas.

In the examples which follow, dog bone samples were formed from a foundry mix 24 hours after mixing (24 hour benchlife) and 48 hours after mixing (48 hour benchlife). Then tensile strengths of the various cured samples were measured immediately (IMM), one hour after curing (1 HR), and 24 hours after curing (24 HR). The test conditions are set forth in Table I. The components used in the Examples are specified in Table II, and the tensile strengths of the dog bone samples prepared with the formulations of the Examples are given in the Table III. Control A and B used an unmodified organic polyisocyanate (OPI) rather than a partially acrylated organic polyisocyanate (PAOPI).

TABLE I

TEST CONDITIONS

| | |
|---|---|
| Sand: | 4000 g Badger 5574 at about 25° C. |
| CT[1] Room: | 50% Relative Humidity, 25° C. |
| Sand Lab: | 33% Relative Humidity, 22° C. |
| Part I/Part II weight ratio: | 20/80 |
| Binder level (bos): | 1.5% |
| Catalyst: | DMEA |
| Gas time (seconds): | 2.0 |
| Purge time (seconds): | 4.0 (Nitrogen) |

[1]CT = constant temperature room.

TABLE II

BINDER FORMULATIONS

| | PART I | | | | PART II | | | | | |
|---|---|---|---|---|---|---|---|---|---|---|
| EXAMPLE | DER | CHP | DCP | OS | OPI | PAOPI/5 | PAOPI/10 | TMPTA | OS | LB |
| Control A | 50 | 40 | 0 | 10 | 33.75 | 0 | 0 | 56.25 | 10 | 0 |
| Control B | 60 | 32 | 8 | 0 | 33.75 | 0 | 0 | 56.25 | 10 | 0 |
| 1 | 60 | 32 | 8 | 0 | 0 | 33.75 | 0 | 56.25 | 5 | 5 |
| 2 | 60 | 32 | 8 | 0 | 0 | | 33.75 | 56.25 | 5 | 5 |
| 3 | 50 | 40 | 0 | 10 | 0 | 33.75 | 0 | 56.25 | 5 | 5 |

TABLE III

(TENSILE STRENGTH IN PSI)

| | SAND 24 hr old mix | | | SAND 48 hr old mix | | |
|---|---|---|---|---|---|---|
| Example | IMM | 1 HR | 24 HR | IMM | 1 HR | 24 HR |
| A | 86 | 172 | 167 | 46 | NA | NA |
| B | 87 | 149 | 171 | 39 | 58 | 70 |
| 1 | 133 | 186 | 232 | 80 | 119 | 122 |
| 2 | 135 | 181 | 256 | 109 | 151 | 144 |
| 3 | 137 | 182 | 231 | 74 | 104 | 112 |

The tests show that cores prepared with sand mixes after 24 hours and 48 hours have higher tensile strengths if the binders contain the partially acrylated organic polyisocyanate. This shows that binders containing the PAOPI have longer benchlife as shown by better tensile strengths than mixes which do not.

Test castings were also prepared with the binder of Example 1. The casting conditions and results are shown in Table IV. The data indicate that the casting quality of the binders of this invention are comparable to commercially available binders and are excellent for the casting of iron.

TABLE IV

IRON CASTING TEST RESULTS
Pouring Temp.: 1500° C.
Sand: Manley IL-5W
Binder Level: 1.5% B.O.S.

| EXAMPLE | EROSION RESISTANCE | PENETRATION RESISTANCE | SURFACE FINISH | VEINING RESISTANCE |
|---|---|---|---|---|
| 4 | 1.0 | 1.5 | 3.0 | 1.0 |
| 5[2] | 1.0 | 1.0 | 2.0 | 1.0 |

Casting grade: 1 = Excellent, 2 = Good, 3 = Fair, 4 = Poor, 5 = Very Poor.
[2]Coating was applied to core before pouring metal.

We claim:
1. A cold-box process for preparing a foundry shape comprising:
   A. preparing a foundry mix comprising:
      (1) a major amount of foundry aggregate; and
      (2) an effective bonding amount of the foundry binder system comprising:
         (a) from 5 to 80 weight percent of an epoxy resin;
         (b) from 15 to 80 weight percent of an acrylated organic polyisocyanate;
         (c) from 5 to 75 weight percent of a reactive unsaturated acrylic monomer, polymer, or mixtures thereof; and
         (d) an effective amount of an oxidizing agent comprising a hydroperoxide, where (a), (b), (c), and (d) are separate components or mixed with another of said components, provided (b) or (c) is not mixed with (d), and where said weight percents are based upon the total weight of the (a), (b), (c), and (d);

B. introducing the foundry mix obtained from step (a) into a pattern;

C. hardening the foundry mix in the pattern to become self-supporting; and

D. curing with a gaseous amine, thereby obtaining a hard, solid, cured foundry shape.

2. The process of claim 1 where the acrylated organic polyisocyanate is a partially acrylated organic polyisocyanate, and the unsaturated acrylic used to modify the organic polyisocyanate is an unsaturated acrylic monomer having a hydroxyl or carboxylic acid group.

3. The process of claim 2 wherein the weight percent of (a) is 5 to 50, the weight percent of (b) is 20 to 40, the weight percent of (c) is 20 to 60, and the weight percent of (d) is 1 to 30, where said weight percents are based upon the total weight of the binder.

4. The process of claim 3 wherein the acrylated organic polyisocyanate is prepared with an acrylic monomer such that the weight ratio of organic polyisocyanate to reactive unsaturated acrylic monomer is from 1:5 to 5:1.

5. The process of claim 4 wherein the reactive unsaturated acrylic monomer used to prepare the acrylated organic polyisocyanate is hydroxy propyl acrylate, and the reactive unsaturated acrylic monomer (c) is an acrylic monomer and the monomer is trimethylolpropane triacrylate.

6. The process of claim 5 wherein the oxidizing agent also contains a peroxide.

7. The process of claim 6 wherein the epoxy resin is selected from the group consisting of epoxy resins formed from a diglycidyl ether of bisphenol A, bisphenol F, epoxy novolac resins and mixtures thereof, and the peroxide of said oxidizing agent is cumene hydroperoxide.

8. The process of claim 7 wherein the amount of free isocyanate in the acrylated polyisocyanate is from 5 weight percent to 20 weight percent, based upon the total weight of the binder.

* * * * *